United States Patent Office 3,840,482
Patented Oct. 8, 1974

3,840,482
PROCESS FOR CURING POLY(VINYL ALCOHOL) MATRIX BEADS
Brian Alfred Bolto, Mitcham, Victoria, and Geoffrey Keith Stephens, Balwyn, Victoria, Australia, assignors to ICI Australia Limited, Melbourne, Victoria, and Commonwealth Scientific & Industrial Research Organisation, Campbell, A.C.T., Australia
No Drawing. Filed Sept. 12, 1972, Ser. No. 288,307
Claims priority, application Australia, Sept. 13, 1971, 6,270/71
Int. Cl. C08f 27/20, 47/02
U.S. Cl. 260—2.1 R         6 Claims

ABSTRACT OF THE DISCLOSURE

In the known process of manufacturing composite ion exchange absorbents in particulate form which absorbent comprising particulate weakly acidic and/or weakly basic ion exchange materials dispersed in a matrix of a cross-linked polyvinyl alcohol said known process comprising forming a dispersion of said ion exchange material in a medium comprising polyvinyl alcohol and then bringing about cross-linking by a suitable method, the improvement consisting of curing the product beads in a solvent swollen condition at a temperature between 80° and 150° at a pH in the range −1 to 2. The composite ion exchange resins have improved properties for use in the "Sirotherm" process.

---

This invention is concerned with ion exchange processes and adsorbents. The present invention has particular application in the so-called "Sirotherm" ("Sirotherm" is a trademark for ICI Australia's thermally regenerable ion exchange resins) process, which is described in the publications:

The "Sirotherm" Demineralisation Process—An Ion Exchange Process With Thermal Regeneration," Part 1, J. Inst. Engr. Aust. (1965) 37, 193;
"An Ion Exchange Process With Thermal Regeneration," Aust. J. Chem. (1966), 19 561 (Part II), 589 (Part III), 765 (Part IV) and 791 (Part V);
Australian Journal of Chemistry, 1968, Vol. 21, pp. 2703–2710, "An Ion Exchange Process With Thermal Regeneration," Part VI;
"Thermally Regenerated Ion Exchange Process—An Aid to Water Management," J. Water Poll. Control Fed, (1966), 38 1782; and Australian Pat. No. 274,029.

The use of ion exchange resins of fine particle size (i.e. less than 70 mesh BSS or 200 microns) is obviously advantageous since the increased surface area per unit volume provides increased reaction rates and more effective resin usage. However, the use of fine resins in commercial ion exchange processes has been precluded largely because of mechanical difficulties associated with the handling and retention of the resin within the equipment concerned. Adsorbent beds of fine particles not only create excessive pressure drops and are prone to clogging and fouling, but they are extremely difficult to backwash effectively owing to the ease with which the fine particles become entrained with the backwashing liquor. The general problem of resin loss by entrainment and fine particle elutriation is critical in some continuous ion exchange processes where the liquor and the adsorbents must be intimately contacted at one stage but must be otherwise handled separately. Consequently, although very fast reaction rates and efficient resin utilization is theoretically available through the use of fine particle resins, commercial ion exchange systems typically employ particle sizes in the range of 14 to 52 BSS mesh (i.e. larger than 300 microns).

In the so-called Sirotherm process referred to above, salt solutions are partially demineralised by a mixture of weak acid and weak base resins which are regenerated thermally. Fine particle kinetics are particularly desirable since although the equilibrium of the adsorbent mixed bed is in some situations very favourable to salt adsorption, the rate of adsorption is low. This is believed to be because the adsorption of salt involves the transfer of protons from the weak acid adsorbent to the weak base adsorbent. The reaction rate is adverse because the proton concentration is low compared with that of salt in the salt solution.

Investigation of this process has shown that because of slow adsorption rates the process generally cannot be operated economically with standard sized (300–1200 microns) resins. However, much faster rates of reaction occur if the resin particle size is reduced from the usual range of 300 to 1200 microns to, for example, 1 to 20 microns or even less, thereby reducing the diffusion path for protons between the acid and base adsorption sites; but the mechanical problems of handling such finely divided adsorbents are severe. It has been proposed that composite ion exchange particles incorporating finely divided ion exchange resins within a water and ion permeable matrix would offer the rate advantages appropriate to much smaller particles. Provided the matrix is highly permeable to water and particularly ions, very good kinetics can be achieved by the use of ion exchange particles of latex or colloidal dimensions dispersed in a homogeneous matrix of a water-insoluble and water- and ion-permeable polymeric material.

By "homogeneous" we mean a material of substantially uniform chemical composition and physical continuity, i.e. composed of a single mass of material, rather than a physical agglomeration of smaller bodies, such as particles, fibres or the like. Nevertheless, the matrix materials may contain voids or pores. For example, such materials may have a degree of porosity such as that encountered in so-called "macroporous" ion exchange resins.

Preferred matrices comprise three-dimensionally cross-linked polymeric materials which are water-insoluble and permeable to water and ions.

It is preferable that the matrix material completely encapsulates the particles of the ion exchange materials. It is also desirable that as far as possible the individual particles are separated from each other by the matrix material.

A material which very suitably satisfies these requirements in a cross-linked poly(vinyl alcohol).

There are many known reagents for cross-linking poly(vinyl alcohol) by reaction with some of the pendant hydroxyl groups and these include: formaldehyde and other aldehydes, in particular dialdehydes such as terephthalaldehyde and glutaraldehyde; dimethylol urea, tetrabutyl titanate, bis-3-methoxy propylidene, pentaerythritol; diazonium and tetrazonium salts, boric acid. Poly(vinyl alcohol) may also be cross-linked by radiation. Other reagents which might be used are those known to cross-link cellulose, e.g. N-methylol and N-methylol ether derivatives of amines, amides and ureas, such as dimethylol dihydroxy ethylene urea and ethyl-N,N-dimethylol carbamate; diepoxides such as diglycidyl ether; ethyleneimine derivatives such as tris-(1-aziridinyl)phosphine oxide; divinyl sulphone and bis-(2-hydroxyethyl)sulphone; epichlorhydrin; phosgene and diacid-dichlorides; and 4,5-dihydroxy-1,3-dimethyl-2-imidazolidinone. Composite adsorbents may be prepared by forming a dispersion of the ion exchange materials in a medium comprising the poly(vinyl alcohol) and a suitable solvent system and then bringing about cross-linking e.g.

by addition of a cross-linking agent, if necessary in the presence of a catalyst, or by irradiation or other techniques known *per se*.

The degree of cross-linking has considerable influence on the mechanical strength of the matrix and the maximum size of ions which are passed by the matrix. For matrices of poly(vinyl alcohol) cross-linked with glutaraldehyde the optimum degree of cross-linking is provided by an amount of glutaraldehyde equivalent to between about 20 and 60 mole percent of the free hydroxyl groups of the poly(vinyl alcohol). The preferred cross-linking agents are those which provide cross-links which are not too flexible. Preferred agents in this regard are glutaraldehyde, terephthalaldehyde and formaldehyde. For the direct production of composite adsorbents in bead form, it is desirable to have a water-soluble cross-linking agent, and glutaraldehyde, therefore, is especially preferred.

For the reasons already stated above the composite adsorbents are preferably in the same form and particle size as conventional ion exchange adsorbents i.e. approximately spherical particles of about 300 to 1200 microns average diameter. However useful composite adsorbents may be made in particles having diameters as small as 50 microns or as large as 2000 microns.

To achieve adequate mechanical strength of the composite particles and economical use of matrix materials the ion exchange materials incorporated in the matrix will preferably have a particle sieve size of less than 20 microns.

The optimum size of the particles of the ion exchange materials will be determined by several factors, including the activity of the materials, the permeability of the matrix and the size of the composite particles. For example, for a matrix of high ionic permeability the particle size of the ion exchange material will largely determine the kinetics of the composite particle and thus the ion exchange material should be as finely divided as possible. In general, the lower limit for the particle size of the ion exchange materials will be set only by the availability of such materials in a suitably finely divided state.

However, for particles below 0.01 microns, interaction between anionic and cationic sites may become substantial.

Ion exchange resins with particle sizes of about 30 to 60 microns are now well known and resins have recently been produced in the 0.5 to 1.5 micron particle size range. However, smaller particles than these can be used if desired. The upper limit for the particle size of the ion exchange materials will be largely determined by the kinetics of the particular materials involved but with presently available ion exchange resins the advantages of the new composite materials will not be realised with dispersed resins of more than about 50 microns particle size.

Again for reasons of mechanical strength the composite particles preferably contain not more than about 60% by weight of the ion exchange materials in a poly(vinyl alcohol) matrix.

The nature of the criteria for selection of the weak acid and weak base ion exchange materials for use in composite adsorbents for the so-called "Sirotherm" process have been described at length and in detail in the above-mentioned publications and will not be further discussed here. Suitable weak base resins include, for example, cross-linked polyvinylbenzyldialkylamines, polytriallylamines, cross-linked polyalkyldiallyamines, cross-linked polyaralkyldiallyamines or copolymers of triallylamines and suitable weak acid resins include, for example, cross-linked polyacrylic acid or copolymers of acrylic or methacrylic acid.

It is known that the matrix materials should combine adequate mechanical toughness with high permeability to the ions which are to be removed from a solution treated with the composite adsorbent. The degree of mechanical strength required will depend on the type of handling the adsorbent will be subjected to in use. In the Sirotherm ion exchange process the solution to be treated will comprise water and soluble salts and a strongly hydrophilic material is therefore preferred. The matrix should also be stable to the repeated thermal cycling inherent in the Sirotherm process.

In the process of manufacturing composite absorbents, comprising a cross-linked polyvinyl alcohol matrix, we have found that the methods used in the past to make a mechanically strong particle also lower the ion exchange rate of the resin and conversely that methods used to raise the ion exchange rate of the particles yield weak particles.

Normally the mechanical strength of resin beads is increased by increasing the degree of crosslinking of the resin. The ion exchange rate in aqueous systems depends to a large extent on the permeability of the resin to water and the permeability is inversely proportional to the degree of crosslinking of the resin. Hitherto resin beads of sufficient mechanical strength for use in a thermally regenerative ion exchange process have only been made at the expense of a major reduction in ion exchange rate.

We have now discovered a process wherein composite absorbents are produced of satisfactory strength for regenerative ion exchange processes and which also have a high rate of ion exchange.

Accordingly we provide in the known process of manufacturing composite ion exchange absorbents in particulate form which absorbent comprising particulate weakly acidic and/or weakly basic ion exchange materials dispersed in a matrix of a cross-linked polyvinyl alcohol said known process comprising forming a dispersion of said ion exchange material in a medium comprising poly(vinyl alcohol) and then bringing about cross-linking by a suitable method, the improvement consisting of curing the product beads in a solvent swollen condition at a temperature between 80° and 150° C. at a pH in the range from −1 to 2. Preferably the temperature of curing lies in the range from 90° C. to 120° C. Preferably the pH is in the range from 0 to 1 inclusive.

Solvents systems capable of swelling cross-linked poly(vinyl alcohol) are well known in the art and include for example oxygenated solvents such as water, methanol, ethanol, acetone, methylethylketone.

Preferably the solvent system comprises water. Our invention is now illustrated by but by no means limited to the following examples.

EXAMPLE 1

Uncured resin beads used as starting material for the process of our invention and consisting of cross-linked polymethacrylic acid particles and polytriallylamine particles in a cross-linked poly(vinyl alcohol) matrix were prepared in the following manner:

A slurry of 37 g. of polytriallylamine hydrochloride resin particles in the size range 1–5 microns in 137 ml. of water was slowly poured into a stirred slurry of 54 g. of cross-linked polymethacrylic acid particles in the size range 1–5 microns in 482 ml. of water and acidified to pH 1.5 with hydrochloric acid. The mixture was allowed to stand overnight and 195 ml. of the liquid was removed by decantation. 77.3 g. of "Gelvatol 20–30" (trademark for a poly(vinyl alcohol), of low molecular weight, 88% hydrolysed) was added to the residue, the pH of the mixture was adjusted to 1.5 with hydrochloric acid and the components were intimately mixed together to give a uniform distribution of solid particles in the final mixture.

Glutaraldehyde (33.2 ml. of a 25% solution in water) was mixed into the slurry with stirring and the mixture dispersed in oil heated to 60° C. After two hours the uncured resin beads were removed and washed in a basket centrifuge with hot water to remove any oil adhering to the beads. When suspended in water the pH of the aqueous phase was between 3 and 4.

EXAMPLE 2

This example demonstrates a known process for curing the uncured resin beads prepared in Example 1.

A portion of the uncured resin beads prepared in Example 1 were rinsed with acetone and dried in an air oven at 100–110° C. for 90 minutes. The product obtained consisted of hard free flowing beads designated beads A.

EXAMPLE 3

One part by volume of the uncured resin beads prepared in Example 1 was gently stirred in 4 parts by volume of hydrochloric acid. The pH and temperature of the hydrochloric acid, and the duration of heating were as shown in Table 1. The product beads were washed with water and acetone and air dried at room temperature.

TABLE 1

| Beads | pH of hydrochloric acid solution | Temp., °C. | Time, hours |
|---|---|---|---|
| B | 1 | 92 | 4 |
| C | 1 | 92 | 8 |
| D | 1 | 92 | 12 |
| E | 1 | 92 | 16 |
| F | 1 | 115 | 1 |
| G | 1 | 125 | 1 |
| H | 1 | 130 | 1 |
| I | 1 | 135 | 1 |
| J | 1 | 145 | 1 |
| K | 0 | 92 | 4 |
| L | 0 | 92 | 16 |
| M | 0 | 115 | 1 |
| N | 0 | 130 | 1 |

EXAMPLE 4

Uncured resin beads were prepared by the method of Example 1, except that 51.5 g. of polytriallylamine hydrochloride resin particles in 191 mls. of water and 37.8 g. of cross-linked polymethacrylic acid particles in 337 mls. of water were used.

EXAMPLE 5

A sample of the beads prepared in Example 4 were cured by the general method described in Example 2, to give resin beads O.

EXAMPLE 6

A sample of the beads prepared in Example 4 were cured by the general method described in Example 3 using 1N.HCl at a temperature of 92° C. for four hours to give resin beads P.

EXAMPLE 7

A sample of the beads prepared in Example 4 were cured by the general method described in Example 3 using 0.5N HCl dissolved in methyl ethyl ketone at a temperature of 80° C. for four hours to give resin beads Q.

EXAMPLE 8

This comparative example not of our invention shows the effect of curing beads at a low pH in an unswollen condition. A sample of the beads prepared in Example 1 were cured by the method described in Example 2, except that prior to oven treatment the beads were stirred for 30 minutes in 10 bed volumes of 1N.HCl, then filtered off and dried in the air oven at 100–110° C. for 90 minutes to give resin beads R.

EXAMPLE 9

The cured resin beads A to R were subjected to an attrition test carried out on the 16–24 Tyler mesh fraction of each of the samples of beads A to R. The attrition tests were performed using 0.3 g. of resin immersed in 20 ml. of water in a "Clinbritic" bottle of capacity 30 ml. to which was added 16 glass beads of 0.25 in diameter. The sealed bottle was rotated end-over-end at 15 r.p.m. in an air oven at 80° C. Break up of the resin beads was determined by microscopic examination and was as shown in Table 2.

| Beads | Approximate percent break up of beads after the following times in days | | | | |
|---|---|---|---|---|---|
| | 3 | 9 | 14 | 21 | 28 |
| A | 15 | 20–25 | 30 | 30–35 | 35 |
| B | 25–30 | 40 | >50 | | |
| C | 25 | 40–45 | >50 | | |
| D | 25 | 40 | >50 | | |
| E | 25 | 40 | >50 | | |
| F | | | | | |
| G | 15–20 | 25–30 | 40–45 | | >50 |
| H | | | | | |
| I | 15 | 15–20 | 30–35 | | 40 |
| J | 10 | 20–25 | 25 | 25–30 | 30 |
| K | 5 | 20 | 25–30 | 30 | 30–35 |
| L | 5 | 25 | 25 | 40 | 40 |
| M | 15 | 20 | 20–35 | 25–30 | 30 |
| N | 15 | 20–25 | 25 | 25–30 | 30 |
| O | 25–30 | 35 | 35–40 | | 40 |
| P | 5–10 | 10–15 | 25 | 25–30 | 30 |
| Q | 3 | 10 | 10–15 | 15–20 | 15–20 |
| R | 3 | | 5 | | 10 |

EXAMPLE 10

The ion exchange properties of the cured resin beads A, B, F, H, K, L, O, P, Q and R were measured in the following general manner. A portion of cured resin beads in the size range 24–35 Tyler mesh was equilibrated by stirring the beads in aqueous saline solution containing 1000 p.p.m. of sodium chloride and adjusting the pH to 7.3 by the addition of alkali, followed by regeneration of the beads with hot distilled water in a jacketed column at 80° C. The time for 50% equilibrium and the effective capacity were measured by plotting as a function of time the volume of aqueous saline solution containing 4000 p.p.m. of sodium chloride which must be added to maintain a salt concentration of 1000 p.p.m. saline, when 7–10 mls. of the thermally regenerated resin were stirred in 200 ml. of 1000 p.p.m. saline at ca. 20° C.

| Beads | Time for 50% equilibrium in minutes | Effective capacity, 20° C.–80° C. in meq./g. |
|---|---|---|
| A | 9.3 | 0.77 |
| B | 2.3 | 0.73 |
| F | 5.3 | 0.80 |
| H | 4.0 | |
| K | 2.3 | 0.73 |
| L | 3.7 | 0.73 |
| O | 8.4 | |
| P | 4.0 | |
| Q | 3.1 | |
| R | 37.0 | |

EXAMPLE 11

Column operation demonstrating a thermally regenerable process was carried out using the cured resin beads A and K. 80 ml. of the resin beads were stirred in aqueous saline solution containing 1000 p.p.m. of sodium chloride at room temperature and 3.0N alkali was added until the pH of the slurry was 7.3. The resin was then packed in a jacketed column. Cold (20° C.) 1000 p.p.m. sodium chloride saline solution and hot (80° C.) 500 p.p.m. sodium chloride saline solution were passed alternately through the column, the cold solution upflow and the hot solution downflow, at flow rates varying from 1.2 to 6.4 gall/cu.ft./min. Salt was released from the resin to the regenerant feed during the hot cycle, to yield a more concentrated solution as effluent, and adsorbed from the feed solution during the cold cycle, to yield a more dilute solution as the product. The operation was carried out by the method described in U.S. Pat. 3,425,937 to give the results shown below:

| Flow rate in gal./cu. ft./min. | | Mean salt concentration in p.p.m. | | Yield of product | | Effective capacity on adsorption or regeneration, 20° C.–80° C. in meq./ml. |
|---|---|---|---|---|---|---|
| Cold | Hot | Product | Effluent | Bed vols. | Percent of treated water | |
| Resin Beads A | | | | | | |
| 1.2 | 1.2 | 335 | 2,110 | 12.8 | 70 | 0.15 |
| 2.1 | 2.1 | 380 | 1,980 | 12.3 | 73 | 0.13 |
| 2.8 | 2.8 | 420 | 1,780 | 10.9 | 70 | 0.11 |
| 3.4 | 3.4 | 430 | 1,810 | 10.9 | 71 | 0.11 |
| Resin Beads K | | | | | | |
| 2.1 | 2.1 | 430 | 2,200 | 19.3 | 74 | 0.19 |
| 2.9 | 4.5 | 420 | 1,800 | 19.2 | 69 | 0.18 |
| 2.7 | 6.4 | 430 | 1,620 | 18.3 | 65 | 0.18 |
| 5.4 | 5.9 | 530 | 1,605 | 21.6 | 70 | 0.17 |

It can be seen that, because of their more rapid rates of adsorption and desorption, the wet-cured resin beads K result in much more superior performance, which can be maintained at higher flow rates, thus increasing the yield of product in a given time.

We claim:

1. In the manufacture of a composite ion exchange absorbent capable of being regenerated by elution with water or saline aqueous solution at a temperature exceeding that employed in the adsorption stage, said absorbent being in the form of beads comprising weakly acidic and weakly basic ion exchange materials dispersed in a matrix of a cross-linked polyvinyl alcohol obtained by forming a dispersion of said ion exchange material in a medium comprising polyvinyl alcohol and a glutaraldehyde cross-linking agent and curing, the improvement whereby beads of increased strength and increased rate of ion exchange are obtained, said improvement consisting of carrying out the curing of said beads with the beads in a solvent swollen condition at a temperature of 80°–150° C. and a pH in the range of from −1 to 2.

2. A process according to Claim 1 wherein the curing is at a temperature between 90 and 120° C.

3. A process according to Claim 1 wherein the curing is carried out at a pH in the range from 0 to 1.

4. A process according to Claim 1 wherein the product beads are swollen with a solvent chosen from the group consisting of methanol, ethanol, acetone and methylethylketone.

5. A process according to Claim 1 wherein the product beads are swollen with water.

6. A process according to Claim 1 wherein the adsorbant comprises a weakly basic resin chosen from the group consisting of cross-linked polyvinylbenzyldialkylamines, polytriallylamines, cross-linked polyalkyldiallylamines, cross-linked polyaralkyldiallylamines, and copolymers of triallylamines and a weakly acidic resin chosen from the group consisting of cross-linked polyacrylic acid and copolymers of acrylic or methacrylic acid and wherein the weakly basic and the weakly acidic resins are both of particle size less than 300 microns.

References Cited
UNITED STATES PATENTS 3,023,199   2/1962   Hawthorne et al. ____ 260—91.3
3,284,238   11/1966   White _____ 136—86

OTHER REFERENCES

Pritchard: Poly(Vinyl Alcohol), Gordon & Breach, London, 1970, pp. 71–72, 95–96.

Helfferich: Ion Exchange, McGraw-Hill, New York, 1962, pp. 36 and 53.

MELVIN GOLDSTEIN, Primary Examiner

U.S. Cl. X.R.

260—2.1 E & C, 2.2 C, 91.3 VA